United States Patent Office

3,734,872
Patented May 22, 1973

3,734,872
DISPERSION OF FINELY DIVIDED PIGMENT PARTICLES AND PROCESS FOR PREPARATION OF THE SAME
Saburo Wakimoto, Nishinomiya, Hideyoshi Tugukuni, Sakai, and Masafumi Kano, Kyoto, Japan, assignors to Dai Nippon Toryo Co., Ltd., and Sinloihi Co., both of Osaka-shi, Japan
Filed Sept. 2, 1971, Ser. No. 177,561
Claims priority, application Japan, Dec. 22, 1970, 45/115,351; Aug. 23, 1971, 46/64,177, 46/64,178, 46/64,179, 46/64,180
Int. Cl. C09d 3/48
U.S. Cl. 260—22 CB          14 Claims

ABSTRACT OF THE DISCLOSURE

A dispersion of finely divided pigment particles useful as printing ink and paint which comprises a copolymer composed of copolymerizable unsaturated monomers uniformly colored with a dyestuff incapable of being copolymerized with said copolymer, said colored copolymer being dispersed uniformly in an organic liquid having no polarity or a low polarity, by a protective layer of a stabilizer and a process for the preparation of the dispersion.

BACKGROUND OF THE INVENTION (i) Field of the invention

The most pertinent prior art may be found in United States Patent Office Classification, Class 260-29.6.

(ii) Description of the prior art

Pigments of colored resin fine particles have heretofore been manufactured by coloring resins with dyestuffs and finely dividing the colored resins. Such pigments are disclosed in, for instance, U.S. Patents 2,809,954; 2,938,873 and 3,116, 256. According to the disclosure of these patent specifications, a co-condensation product of formaldehyde with a cyclic aminotriazine compound and an aromatic monosulfonamide compound is used as a base resin and the base resin is colored with a dyestuff. Consequently there can be obtained a high concentration of clearly colored resinous fine particles. However, since colored, agglomerated condensation resins must be mechanically ground to fine particles, high energy is required for grinding and the manufacturing cost becomes great. Further, it is very difficult to obtain the colored pulverized resin having an average particle size of less than 1.5μ. Still further, when the dyestuff is used in an amount exceeding 1% based on the resin, the resulting colored resin is extremely inferior in light fastness.

As to the solution of the problem involved in the pulverization, there has been proposed a method comprising dispersing a resin incapable of solvation in an organic liquid, in the finely divided state into an organic liquid. In this method, a resin colored with a dyestuff contained therein is prepared in advance, and the resin is incorporated in a heated and molten state into a stabilizer solvated with an organic liquid and forcibly dispersed therein. Such method is disclosed in, for instance, U.S. Patents 3,412,034 and 3,412,035. Most of the resins used in the methods of these U.S. patent specifications are co-condensation products of formaldehyde with aminotriazine compounds and aromatic monosulfonamide compounds such as disclosed in the specifications of U.S. Patents 2,809,954 and 2,938,873, and then the resins are colored with dyestuffs. In such methods, there can be obtained highly concentrated, finely divided colored dispersions, but the products have the defect of poor light fastness.

Further, there has been known a method comprising emulsion polymerization or suspension polymerization of vinyl chloride alone or with an unsaturated monomer copolymerizable with vinyl chloride in an aqueous medium to form an uncolored, finely divided polymer and dyeing the polymer with a fluorescent dye with a dyeing assistant (for example, British Patent 822,709). In this method, however, it is impossible to color the polymer at a high concentration. Further, when the dyestuff is used in an amount exceeding about 1% based on the polymer, the light resistance of the colored resin is extremely poor.

There has also been known a method comprising preparing an uncolored, finely divided polymer in a manner similar to the above method from styrene or vinyl acetate alone or together with an unsaturated monomer copolymerizable therewith, and dyeing the polymer with a dyestuff with a specific mordant (such as British Patent 820,207). As to this method, the resulting colored polymer lacks in color clearness, and it is impossible to obtain a daylight-fluorescent pigment. Further, when the colored polymer obtained in the aqueous medium is dispersed in an oil and used for a printing ink or paint, it is necessary to pulverize the colored polymer by spray drying or the like and to employ a high power agitator or roll mill, or otherwise to adopt the flushing step in order to disperse the pulverized colored polymer into the oil. Accordingly, the manufacturing cost becomes very high. Moreover, the resulting ink or paint is defective in various points such as light fastness, color strength and clearness.

BRIEF DESCRIPTION OF THE DRAWING

In the drawing, the ordinate indicates the degree of discoloration and the abscissa the time of Fade-O-Meter radiation.

SUMMARY OF THE INVENTION

This invention relates to a clear strongly colored, finely divided pigment dispersion having excellent light fastness.

More specifically, the present invention relates to a finely divided colored dispersion produced by a polymerizing copolymerizable, unsaturated monomers in an organic liquid capable of dissolving said copolymerizable unsaturated monomers but incapable of dissolving a copolymer prepared from said monomers, in the presence of a stabilizer solvated with said organic liquid, and said finely divided dispersion is uniformly colored with a dyestuff, especially a water-soluble dyestuff, or a dye complex composed of a water-soluble dyestuff and a substance having an electric charge opposite to that of the water-soluble dyestuff.

DETAILED DESCRIPTION OF THE INVENTION

As the organic liquid to be used for the dispersion medium in the invention, there may be mentioned non-polar aliphatic and aromatic hydrocarbons having a relatively low dissolving power, such as VM & P naphtha, mineral spirit, kerosene, petroleum naphtha, and solvent naphtha. There may also be used aliphatic and alicyclic hydrocarbons such as n-hexane, n-heptane, n-octane, n-decane, cyclohexane and cycloheptane.

The "stabilizer" to be used in the invention includes organic compounds which (1) have a constituent compatible with a copolymer composed of copolymerizable unsaturated monomers or are chemically bonded to such copolymers and (2) have a long-chain hydrocarbon group capable of solvation with the above-mentioned organic liquid. As the organic compounds there may be exemplified monomers containing an ester linkage and an alkyl group comprising 6 or more carbon atoms, such as hexyl acrylate, hexyl methacrylate, 2-ethylhexyl acrylate, 2-ethylhexyl methacrylate, octyl acrylate, octyl methacrylate, dodecyl acrylate, dodecyl methacrylate, octadecyl acrylate and octadecyl methacrylate, and polymeres thereof; monomers containing two ester linkages and an alkyl group comprising 6 or more carbon atoms, such as dihexyl fumarate, di-2-ethylhexyl fumarate, dioctyl fumarate, di-octadecyl fumarate, dihexyl maleate, di-2-ethylhexyl maleate, dioctyl maleate, dioctadecyl maleate, dihexyl itaconate, di-2-ethylhexyl itaconate, dioctyl itaconate and dioctadecyl itaconate, and polymers thereof; polymeric vinyl esters having a long-chain alkyl group, such as poly vinyl stearate; depolymerized polyethylene wax; depolymerized polyisoprene; liquid polybutadiene; depolymerized natural rubber; unsaturated fatty acid-modified alkyd resins; urethaneated oils; unsaturated fatty acid-modified epoxy resins, ester gum; petroleum resins; and natural resin-modified synthetic resins and the like. Further, natural oils and partially oxidized or polymerized products of natural oils may also be used. As natural oils there may be mentioned linseed oil, tung oil, Chinese-wood oil, oiticica oil, perilla oil, dehydarted castor oil, tall oil, soy bean oil, safflower oil, cotton seed oil and the like.

These stabilizers may be used singly or in admixtures of two or more of them.

Since the stabilizers exist as the protective layer around the copolymers formed by polymerization of copolymerizable unsaturated monomers, the copolymer particles are kept stable for a long time.

Copolymerizable unsaturated monomers to be used in the present invention include various monomers. For better illustration, they are divided into the following three groups:

(1) Monomers of Type A

The monomers of this type have in common a low affinity for dyestuffs. As monomers of this type, there may be exemplified acrylic esters such as methyl acrylate, ethyl acrylate, n-propyl acrylate, isopropyl acrylate, and n-butyl acrylate; methacrylic esters such as methyl methacrylate, ethyl methacrylate, n-propyl methacrylate and n-butyl methacrylate; and other unsaturated monomers having a low affinity for dyestuffs such as styrene, vinyl toluene, vinyl formate, vinyl acetate, vinyl propionate, vinyl butyrate, allyl acetate, allyl chloride, methallyl chloride, diethyl itaconate, diethyl maleate, vinyl chloride and vinylidene chloride. These monomers may be used singly or in combination.

(2) Monomers of Type B

The monomers of this type are copolymerizable unsaturated monomers having one or two cyano groups. As such monomers, there may be exemplified acrylonitrile, methacrylonitrile and vinylidene cyanide. These monomers may be used singly or in combination. The —C≡N group contained in these monomers has a relatively high affinity for dyestuffs and therefore, exhibits the effect of improving the color clearness. Further, since the cyano group has a high electron-attracting property, the monomers of this type are useful for improving the light fastness of the resulting dispersion.

(3) Monomers of Type C

The monomers of this type include monomers having a functional group exhibiting a very high affinity for dyestuffs. As the monomers having an acidic group, there may be exemplified methallyl sulfonic acid, vinyl benzene, sulfonic acid, acrylic acid, methacrylic acid, maleic acid, maleic anhydride, fumaric acid, crotonic acid, crotaconic acid, itaconic acid, 2-hydroxyethyl acrylate, 2-hydroxypropyl acrylate, 2-hydroxyethyl methacrylate, 2-hydroxypropyl methacrylate, N-methylol acrylamide, allyl alcohol, 2-hydroxy-3-chloropropyl methacrylate, glycidyl methacrylate.

As monomers having a basic group, there may be exemplified N-vinyl imidazole, N-allyl benzoimidazole, 2-isopropenyl pyridine, allyl nicotinate, allyl isonicotinate, N-allyl-isonicotinic acid amide, vinyl pyridine and its derivatives, vinyl piperazine, N-allyl-2-methyl-imidazoline, N-vinyl pyrrolidone, N-vinyl caprolactam, 2-vinyl mercaptobenzothiazole, acrylamide, methacrylamide and diacetone acrylamide.

These monomers may be used singly or in admixtures of two or more of them.

The monomers of type A may be used alone, but the coloring property and the light fastness are not so good. When the monomers of type B or C are used singly or in combination, the polymerization cannot be accomplished with good result. Combinations of the monomers of types A and B, or A and C give excellent coloring property and light fastness as compared with single use of the monomers of type A. It is preferred that the weight ratio of type A monomer/type B monomer be in the range of from 95/5 to 20/80 and the weight ratio of type A monomer/type C monomer be in the range of from 99/1 to 70/30. The combination of the monomers comprising types A, B and C is especially preferred, because it gives a product having excellent color clearness at high concentration and light fastness. The reason is considered to be that a suitable combination of polarities provided by the monomers A, B and C, can disperse the dyestuff uniformly without causing association of the dyestuff. In a combination of the monomers A, B and C, it is preferred that the ratio of these monomers be 90–20% of the monomers of Type A, 80–5% of monomers of type B, and 30–1% of monomers of type C by weight.

The following type of monomers may also be used in the present invention.

(4) Monomers of Type D

This type of monomers have two or more terminal double bonds. As such monomers, there may be exemplified divinyl benzene, diallyl phthalate, triallyl cyanurate, ethyene glycol dimethacrylate, diethylene glycol dimethacrylate, triethylene glycol dimethacrylate, tetraethylene glycol dimethacrylate, polyethylene glycol dimethacrylate, neopentyl glycol dimethacrylate, 1,3-butylene glycol dimethacrylate, trimethylol trimethacrylate, trimethylol propane trimethacrylate, pentaerythritol tetramethacrylate, polyethylene glycol diacrylate, propylene glycol diacrylate and the like. These monomers may be used singly or in the form of an admixture of two or more of them. When the monomers of this type are used in an amount of 0.1–5.0% based on the weight of the monomers of types A, B and C, the heat resistance or the chemical resistance of the resulting dispersion product can be conspicuously improved.

The total amount of the monomers of types A, B and C is in the range of from 15 to 60% by weight, preferably 25 to 55% by weight, based on the final dispersion product. The ratio of the stabilizer/the monomers of types A, B and C is peferably in the range of from 70/30 to 10/90.

As radical initiators for polymerization of the copolymerizable unsaturated monomers, there may be employed, for instance, organic peroxide initiators, such as benzoyl peroxide, cumene hydroperoxide, di-tertiary-butyl peroxide and acetyl peroxide, and $\alpha,\alpha$-azobisisobutyronitrile type initiators. The amount of the initiator is from 0.05 to 5.0%, by weight, preferably 0.5–1.5% by weight, based on the copolymerizable unsaturated monomers.

Dyestuffs incapable of polymerizing with the copolymerizable unsaturated monomers are used in the present invention.

Examples of such dyestuffs are as follows:

(1) Dyestuffs having an amino group or its modified groups and exhibiting a cationic property in a dilute acidic solution, such as basic and cationic dyestuffs of triphenyl methane, diphenyl methane, xanthene, acryzine, azine, thiazine, thiazole, oxazine and azo types Primoflavin 8G manufactured by Sumitomo Chemical (Color Index: Basic Yellow 1)
Aizene Catilon Brilliant Yellow 5GLH manufactured by Hodogaya Chemical (Color Index: Basic Yellow 13)
Aizene Catilon Orange RH manufactured by Hodogaya Chemical (Color Index: Basic Orange 22)
Rhodamine 6GCP manufactured by Sumitomo Chemical (Color Index: Basic Red 1)
Aizene Catilon Violet 3BLH manufactured by Hodogaya Chemical (Color Index: Basic Violet 25)
Rhodamine B manufactured by Ciba Limited (Color Index: Basic Violet 10)
Aizene Basic Cyanine 6GH manufactured by Hodogaya Chemical (Color Index: Basic Blue 1)
Aizene Diamond Green GH manufactured by Hodogaya Chemical (Color Index: Basic Green 1)
Aizene Catilon Gray BLH manufactured by Hodogaya Chemical (Color Index: Basic Black 2)

(2) Water-soluble dyestuffs having sulfonic or carboxylic groups such as acidic dyestuffs of anthraquinone, triphenyl methane, azo, nitro, nitroso, xanthene, azine and quinoline types Solar Yellow NY Conc manufactured by Sumitomo Chemical (Color Index: Acid Yellow 1)
Elio Fast Yellow G manufactured by Geigy AG (Color Index: Acid Yellow 19)
Elio Fast Red 2GS manufactured by Geigy AG (Color Index: Acid Orange 19)
Kayaku Silk Scarlet manufactured by Nippon Kayaku (Color Index: Acid Red 9)
Lissamine Fast Red 4G manufactured by Imperial Chemical (Color Index: Acid Red 30)
Alizarine Fast Violet 2RC manufactured by Ciba Limited (Color Index: Acid Violet 36)
Lissamine Ultra Blue AR manufactured by Imperial Chemical (Color Index: Acid Blue 71)
Lissamine Green V manufactured by Imperial Chemical (Color Index: Acid Green 16)
Mitsui Fast Gray BBLW Conc manufactured by Mitsui Chemical (Color Index: Acid Black 48)

(3) Dyestuffs soluble in water and being absorbed directly in vegetable fibers such as cotton and viscose fibers, such as direct dyestuffs of stilbene, triazole and dioxazine types Direct Fast Yellow GN manufactured by Nippon Chemical (Color Index: Direct Yellow 85)
Nippon Orange GG Conc manufactured by Sumitomo Chemical (Color Index: Direct Orange 6)
Aizene Direct Fast Red FH manufactured by Hodogaya Chemical (Color Index: Direct Red 1)
Direct Blue RW manufactured by Ciba Limited (Color Index: Direct Blue 22)
Direct Green B manufactured by Hodogaya Chemical (Color Index: Direct Green 6)
Direct Fast Black B manufactured by Mitsubishi Kasei (Color Index: Direct Black 22)

(4) Dyestuffs soluble in water and having a fluorescent brightening activity such as fluorescent dyestuffs of diaminostilbene disulfonic acid, distilylbenzene, benzidine, benzidone, benzidine sulfone, diaminofluorene, imidazole, imidazolone and triazole types Daitophor AN manufactured by Daito Chemical (cationic)
Blankophor WT manufactured by Bayer AG (anionic)
Tinopal GS manufactured by Geigy AG (anionic)
Tinopal 2B manufactured by Geigy AG (anionic)
Tinopal BV manufactured by Geigy AG (anionic)
Leucophor B manufactured by Sandoz AG (anionic)
Leucophor R manufactured by Sandoz AG (anionic)
Uvitex RS manufactured by Ciba Limited (anionic)
Uvitex RT manufactured by Ciba Limited (anionic)

(5) Water-insoluble fluorescent brightening dyestuffs such as cumarine derivatives, oxazole derivatives, imidazole derivatives, thiazole derivatives and stilbene derivatives Mikephor FFD Conc manufactured by Mitsui Chemical (Color Index): Fluorescent Brightening Agent 177)
Kayalight 3 manufactured by Nippon Kayaku (Color Index: Fluorescent Brightening Agent 91)
Whiter NKR manufactured by Sumitomo Chemical (Color Index: Fluorescent Brightening Agent 172)
Mikawhite ATC Conc manufactured by Nippon Kayaku (Color Index: Fluorescent Brightening Agent 163)
Whitex ERN Conc manufactured by Sumitomo Chemical (Color Index: Fluorescent Brightening Agent 135)
Whitex SF Conc manufactured by Sumitomo Chemical (Color Index: Fluorescent Brightening Agent 153)

(6) Dyestuffs free of water-soluble groups and soluble in oil and fats and hydrocarbons or in polar solvents (many of the dyestuffs of this group are included in the azo type dyestuffs, but some of them are dyestuffs of the anthraquinone, nigrosine or azine types)

Diaresin Yellow A manufactured by Mitsubishi Kasei (Azo type)
Sumiplast Yellow F5G manufactured by Sumitomo Kasei (aminoketone type)
Diaresin Yellow C manufactured by Mitsubishi Kasei (monoazo type)
Diaresin Orange G manufactured by Mitsubishi Kasei (anthraquinone type)
Sumiplast Red FB manufactured by Sumitomo Kasei (anthraquinone type)
Diaresin Red EL manufactured by Mitsubishi Kasei (azo type)
Diaresin Violet A manufactured by Mitsubishi Kasei (anthraquinone type)
Diaresin Blue C manufactured by Mitsubishi Kasei (anthraquinone type)
Rhodamine B Base manufactured by Sumitomo Chemical (Color Index: Solvent Red 49)

These dyestuffs may be used in amounts of 0.3–25% by weight based on copolymerizable unsaturated monomers of types A, B and C. Preferable amounts of the dyestuffs are in the range of from 0.5 to 10% by weight. When the pigment dispersion is applied in the form of a thick film, such as paints or coating materials, the dyestuff concentration of 0.3–3% is appropriate. When a high tinting strength is required and the pigment dispersion is applied in the form of a thin thickness, such as offset printing inks, a dyestuff concentration exceeding 3% is preferable.

Particularly when fluorescent dyestuffs, for example, coloring fluorescent dyestuffs such as Rhodamine B or fluorescent brightening dyestuffs such as diaminostilbene disulfonic acid derivatives, are used as the dyestuffs, the resulting dispersions exhibit a fluorescent brightening or a whitening color excellent in the light fastness.

The addition of dyestuffs may be accomplished by dispersing or dissolving them directly in the organic liquid or by dissolving or dispersing them into copolymerizable unsaturated monomers. In the case of cationic, basic, direct and water-soluble fluorescent dyestuffs, there may be adopted a method comprising blending dyestuffs with substances which have an electric charge opposite to that of the dyestuffs, whereby forming dyestuff complexes easily soluble in the monomers, and further dissolving or dispersing the complexes in the organic liquid or monomers. By adopting this method, it is possible to increase the dyestuff concentration. It is preferred to add the substances having an electric charge opposite to the electric charge of the dyestuffs in almost equivalent amounts to the dyestuffs used.

In the case of basic dyestuffs, cationic dyestuffs and cationic fluorescent brightening dyestuffs, anionic surfactants are used as substances having an opposite electric charge. As the anionic surfactants, there may be exemplified as sodium dialkyl sulfosuccinate, sodium polyoxyethylene alkyl sulfate, sodium polyoxyethylene alkyl phenyl sulfate, sodium polyoxyethylene aky sulfate, naphthalene sulfonic acid-formaldehyde condensation product, sodium alkyl naphthalene sulfonate and sodium dodecylbenzene sulfonate.

In the case of acidic deystuffs, anionic direct dyestuffs and anionic fluorescent brightening dyestuffs, cationic surfactants are used as substances having an opposite electric charge. As the cationic surfactants, there may be exemplified as lauryl trimethyl ammonium chloride, stearyl trimethyl ammonium chloride, distearyl dimethyl ammonium chloride, alkyl benzene dimethyl ammonium chloride, polyoxyethylene alkyl amine, sodium lauryl amine acetate and the like.

When the above-mentioned method comprising forming the dyestuff complex is adopted, it is possible to obtain a pigment dispersion having such a high dyestuff concentration as 50% based on the weight of copolymerizable unsaturated monomers, which could not have been attained in the conventional methods.

As the alternative method of the present invention, there is adopted a method adding polycondensation polymers, which are soluble in the monomer B but insoluble in an organic liquid, to the monomer of type B in an amount of 1–15% by weight. This method is effective for improving the solubility and dispersibility of the dyestuffs. Further, when the dyestuff is dissolved or dispersed in advance into the polycondensation polymers and the resulting colored polycondensation polymers are dissolved in the monomer of type B, little soluble dyestuff can be easily incorporated in high concentrations.

As the polycondensation polymers, there may be exemplified as aromatic monosulfonamide-formaldehyde resins, imidazolidinedione (e.g., hydantoin or a dimethyl hydantoin)-formaldehyde resins, cyanuric acid or isocyanuric acid-formaldehyde resins, urazol-formaldehyde resins, triazolone-formaldehyde resins, triazolidone-formaldehyde resins, acetylene urea-formaldehyde resins and the like. It is also possible to cocondense these resins with one or more of amino-triazines, such as melamine, acetoguanamine, benzoguanamine, phthaloguanamine and spiroguanamine, urea, guanazol, and the like, so far as the solubility of these resins into the monomer of type B is not substantially inhibited. In addition, ketone resins and epoxy resins may be used as polycondensation polymers. These polymers to be added to the monomer of type B may be used singly or in admixtures of two or more of them.

In order to further improve the light fastness, an antioxidant may be incorporated in the present invention. As the antioxidant, there may be exemplified 3-methyl-4-isopropyl phenol, 2,6-di-tert.-butyl-4-methyl phenol, 3,5-di-tert.-butyl-4-hydroxy toluene, 2,6-di-tert.-butyl-p-cresol, 2,5 - di - tert.-butyl hydroquinone, 2,2'-methylene-bis(4-methyl-6-tert.-butyl phenol), 4,4'-thio - bis(3-methyl-6-tert.-butyl phenol), dilauryl-thio-dipropionate, triphenyl phosphate, tri-o-cresol phosphate and distearyl-thio-dipropionate. Further, there may be used ultraviolet absorbents and ultraviolet-resistant stabilizers, such as phenyl salicylate, p-tert.-butyl-phenyl salicylate, resorcinol monobenzoate, substituted hydroxyphenyl benzotriazoles, 2,2',4,4'-tetrahydroxy benzophenone and the like.

Reaction conditions for the preparation of the dispersions of the invention will now be described.

The polymerization of copolymerizable unsaturated monomers can be effected at a temperature ranging from 50 to 120° C., preferably 60 to 90° C. The reaction time is in the range of from 3 to 20 hours. It is preferred to control the reaction conditions so as to accomplish the polymerization in 8–12 hours. The monomers may be added at one time or in a divided manner. It is also possible to add the monomers continuously for a certain period of time. In case the polymerization is a violent exothermic reaction or the monomers are added in greater amounts, it is preferred to effect the addition in a divided manner in view of the safety in the operation. It is preferred to substitute an atmosphere by nitrogen, but any particular disadvantage is not brought about without substitution.

The pigment dispersions are formed by polymerizing the copolymerizable unsaturated monomers in the presence of the dyestuff or the dyestuff complex.

However, the usefulness of the dyestuff complex is not limited to previously described method. For instance, when the dyestuff complex is blended to a preliminary prepared uncolored copolymer dispersion and the resulting blend is heated, the dyestuff complex is diffused into the interior of the copolymer particles and dyes the particles quite well. Thus, there can be obtained a uniformly colored, finely divided pigment dispersion. When the copolymerization is effected in the presence of the dyestuff complex, it is preferable to adopt the combination of the monomers A and B, or A and C, especially A, B and C. The proportions of these monomers are as explained hereinbefore.

The properties of the finely divided pigment dispersion obtained by after dyeing with the dyestuff complex are almost equivalent to those of the pigment dispersion obtained by polymerizing the copolymerizable unsaturated monomers in the presence of the dyestuff complex.

In the finely divided pigment dispersion of the present invention, the protective layer of the stabilizer is formed around a solid solution of the copolymer formed from the copolymerizable unsaturated monomers and dissolving dyestuff uniformly, whereby said solid solution is present in the form of a fine particle dispersed stably by dint of said protective layer in the organic liquid having no or low polarity. The average size of said fine particle is $0.1–5\mu$, and preferably at least 90% of the particles have a size in the range of from 0.1 to $1.5\mu$. Such pigment dispersion exhibits quite excellent characteristics, when prepared into a printing ink or paint. For instance, when it is used as an ink for offset printing or typographical printing, it shows an excellent ink clearness, printability, quick-drying property and light fastness. Further, when it is used as the paint, it shows an excellent adherence and flexibility. Since the organic liquid having no or low polarity is used for the dispersion medium of the present invention, it does not swell or dissolve a primer.

As described above, the pigment dispersion prepared from the combination of the monomers A, B and C is especially excellent in light fastness and coloring property. The reasons are considered as follows:

(i) The monomer of type A has an ability of disuniting a dyestuff association caused by high affinity of the monomers B and C, and the dyestuff. (When dyestuff association occurs, the clearness and the light fastness of the pigment particles are lowered.)

(ii) Since the —C≡N group of the monomer B has not only a high affinity with the dyestuff but also a high electron-attracting property, an effect of inhibiting formation of peroxide can be attained. It is said that the —C≡N group has an ability to convert the peroxide into harmless oxygen causing no discoloration. The following reaction shows such changes.

(iii) The monomer of type C has an extremely high affinity for the dyestuff.

This invention will now be explained in more detail by referring to examples, where all of the percentage and parts are based on the weight.

EXAMPLES 1–3 AND COMPARATIVE EXAMPLES 1–4

A glass reactor equipped with a stirrer, a thermometer, a cooling tube, a dropping funnel and a heating device was charged with the following reactants:

| | Parts |
|---|---|
| Mineral spirit | 450 |
| Soy bean oil-modified alkyd resin (oil length=70) | 200 |
| Aizene Catilon Orange RH | 3.5 |
| Benzoyl peroxide | 2.0 |

They were uniformly dissolved at 80° C. by agitation. A mixture of 200 parts of methyl acrylate and 150 parts of acrylonitrile was introduced dropwise to the content of the reactor from the dropping funnel over a period of 4 hours. After completion of the dropwise addition, the reaction was effected for 6 hours. Thus, there was obtained a pigment dispersion exhibiting an orange color.

Example 1 was repeated by changing the recipe of the reactants as indicated in Table 1 below.

TABLE 1

| | Recipe (parts) | | | | | | |
|---|---|---|---|---|---|---|---|
| | Mineral spirit | Soybean oil-modified alkyd resin | Aizene catilon orange RH | Benzoyl peroxide | Methyl acrylate | Acrylo-nitrile | Meth-acrylic acid |
| Example: | | | | | | | |
| 2 | 450 | 200 | 3.5 | 2.0 | 300 | | 50 |
| 3 | 450 | 200 | 3.5 | 2.0 | 170 | 150 | 30 |
| Comparative Example: | | | | | | | |
| 1 | 450 | 200 | 3.5 | 2.0 | 350 | | |
| 2 | 450 | 200 | 3.5 | 2.0 | | 350 | |
| 3 | 450 | 200 | 3.5 | 2.0 | | | 350 |
| 4 | 450 | 200 | 3.5 | 2.0 | | 200 | 150 |

The stability of the resulting pigment dispersion was poor in Comparative Examples 2, 3 and 4, and the products of Examples 1 and 3 exhibited a very excellent stability.

The product of Example 3 was the best with respect to coloring property and light resistance. Next to the product of Example 3, products of Examples 1 and 2 and Comparative Example 1 exhibit excellent coloring property and light fastness in that order.

EXAMPLE 4

In the same reactor as used in Example 1, 450 parts of mineral spirit and 200 parts of soy bean oil-modified alkyd resin (oil length=70) were maintained at 80° C. under agitation. A homogeneous mixture of the following recipe:

| | Parts |
|---|---|
| Aizene Catilon Orange RH | 10.5 |
| Sodium alkyl sulfosuccinate | 20.0 |
| Methyl acrylate | 170.0 |
| Acrylonitrile | 150.0 |
| $\alpha,\alpha'$-Azobisisobutyronitrile | 3.0 | was added dropwise to the content of the reactor over a period of 3 hours. After completion of the dropwise addition, the temperature was elevated to 90° C. and the reaction was effected at this temperature for 7 hours. Thus, there was obtained a pigment dispersion having a highly concentrated orange color. The product of this example exhibited a more highly concentrated and clearer color than the product of Example 3. Further, the product of this example is superior to the product of Example 3 also with respect to light fastness.

EXAMPLE 5

The same reactor as used in Example 1 was charged with the following reactants:

| | Parts |
|---|---|
| Isooctane | 450 |
| Styrenated alkyd resin | 50 |
| 2-ethylhexyl acrylate | 150 |
| Benzoyl peroxide | 1.5 | and the reaction was carried out at 80° C. for 3 hours under agitation. Then, a homogeneous dispersion of the following recipe:

| | Parts |
|---|---|
| Methacrylonitrile | 150 |
| Vinyl acetate | 150 |
| 2-vinyl pyridine | 50 |
| Solar Yellow NY Conc | 10.5 |
| Lauryl trimethyl ammonium chloride | 10.5 |
| Benzoyl peroxide | 3.0 | was added dropwise to the contents of the reactor over a period of time or 3 hours. After completion of the dropwise addition, the reaction was continued for 5 hours. Thus there was obtained a pigment dispersion exhibiting a concentrated yellow color.

EXAMPLE 6

A pressure polymerization vessel was charged with the following reactants:

| | Parts |
|---|---|
| High boiling point petroleum hydrocarbon (boiling point=260–280° C.) | 370 |
| Ester gum | 100 |
| Dehydrated caster oil-modified alkyd resin | 80 |
| Vinylidene cyanide | 200 |
| Maleic anhydride | 10 |
| $\alpha,\alpha'$-Azobisisobutyronitrile | 1 |

The polymerization was initiated under pressure and agitation while maintaining the temperature at 80° C. When the reaction was continued for about 2 hours, a homogeneous dispersion of the following recipe:

| | Parts |
|---|---|
| Methyl methacrylate | 140 |
| Daitophor AN | 10 |
| 50% aqueous solution of sodium polyoxyethylene phenyl sulfate | 20 |
| $\alpha,\alpha'$-Azobisisobutyronitrile | 2 | was added dropwise to the content of the polymerization vessel over a period of time of 3 hours. After completion of the dropwise addition, the reaction was further continued for 5 hours. Thus, there was obtained a pigment dispersion characterized by a very high transparency. The product was usable as an invisible ink and exhibited a fluorescent brightness under radiation of black light.

EXAMPLE 7 AND COMPARATIVE EXAMPLE 5

The same reactor as used in Example 1 was charged with the following reactants:

| | Parts |
|---|---|
| High boiling point petroleum hydrocarbon solvent (boiling pint=250–270° C.) | 300 |
| Safflower oil-modified alkyd resin | 90 |
| Ester gum (melting point=180° C.) | 60 |
| Polyethylene wax | 50 | and they were dispersed and dissolved homogeneously at 120–150° C. under agitation, following which the temperature was maintained at 80° C.

Separately, a beaker was charged with 20 parts of Rhodamine B and 66 parts of 30% aqueous solution of sodium dodecyl benzene sulfonate and the mixture was heated to form a hydrophobic dyestuff complex. Then, 320 parts of methyl acrylate was added to the reaction mixture, the hydrophobic dyestuff complex was selectively dissolved in the methyl acrylate, and the aqueous phase was separated in the bottom portion of the beaker. The aqueous phase was removed with use of a separating funnel, and 150 parts of acrylonitrile, 30 parts of acrylic acid and 4 parts of di-tert.-butyl peroxide were added to the dyestuff complex. The mixture was blended uniformly, and the homogeneous mixture was added dropwise to the above-mentioned content of the reactor over a period of 5 hours. After completion of the dropwise addition, the reaction was carried out for 7 hours. Thus, there was obtained a very viscous pigment dispersion exhibiting a concentrated magenta color with a fluorescent brightness.

The solids content of the resulting dispersion was 70% by weight and the size of the dispersed resin particles was in the range of from 0.1 to 1.0μ. The product was usable as a base of an offset printing ink or typographical printing ink.

In order to illustrate the utility and advantages of the product of this example, comparative tests of light fastness were conducted using fluorescent inks for offset and typographical printing prepared from the product of this example and from the conventional pigment dispersion.

Sample A (present invention)

With use of the magenta-colored pigment dispersion obtained in Example 7, a printing ink of the following recipe was prepared:

| | Parts |
|---|---|
| Pigment dispersion | 70 |
| Rosin-modified phenol varnish | 25 |
| Drier and other additives | 5 |

The ink thus formed was printed by means of a printing machine. The water-resistance of the ink could be improved by incorporation of a cationic surfactant.

Sample B (Comparative Example 5)

A colored resin dispersion was prepared in almost the same manner as in Example 1 of the specification of U.S. Pat. 3,412,035. More specifically, a component (I) of the following recipe:

| | Parts |
|---|---|
| Borax | 15 |
| Water | 200 |
| o- or p-Toluene sulfonamide | 513 |
| Melamine | 126 |
| Paraformaldehyde (80% active) | 240 |
| Rhodamine B | 30 | was melted and homogeneously blended at 100° C. and the melt was poured into a component (II) of the following recipe:

| | Parts |
|---|---|
| Linseed oil | 100 |
| 10% styrenated alkyd resin (Scopol 41 N manufactured by Styrene Copolymer Co.) | 250 |
| Styrenated alkyd resin (Scopol 341–17 manufactured by Styrene Copolymer Co.) | 200 |
| Petroleum type high boiling point solvent (boiling point=250° C.) | 240 |

Then, the mixture was agitated vigorously and the temperature was elevated to 140° C. to pulverize the component (I) into particles of a 0.5μ size, following which the temperature was returned to room temperature. The resulting colored resin dispersion exhibited a magenta color fluorescent brightness. Using this dispersion, a printing ink of the following recipe was prepared:

| | Parts |
|---|---|
| Colored resin dispersion | 80 |
| Linseed oil | 10 |
| Petroleum type high boiling point solvent | 5 |
| Drier and other additives | 5 |

The resulting ink was printed in the same manner as the sample A was printed.

Figure 1:
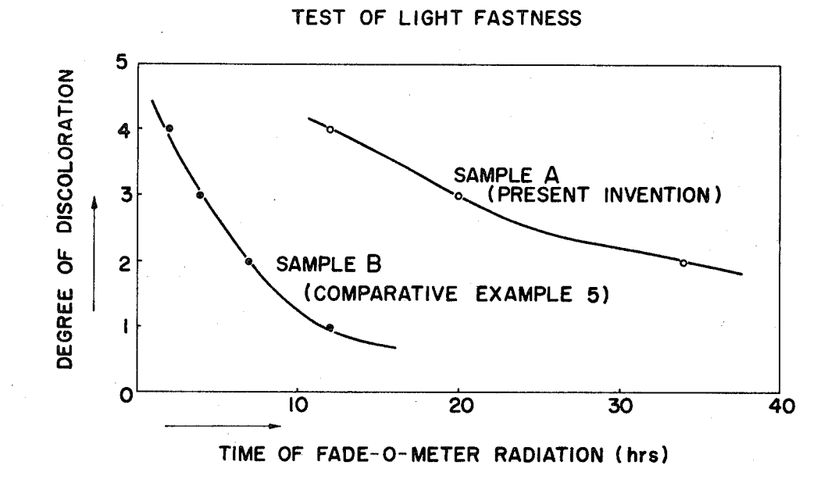
The accompanying drawing is a graph illustrating the light fastness of the printed material printed with a daylight-fluorescent ink prepared in Example 7.

Printed matters formed using sample inks A and B were tested with a Fade-O-Meter of Type CF–20 manufactured by Shimazu Seisakusho to evaluate the light fastness. The results were plotted in the accompanying drawing. The degree of discoloration shown in the ordinate of the drawing was determined on the following scale:

| Degree | Discoloration | Utility of printed material |
|---|---|---|
| 1 | Not discolored | Usable. |
| 2 | Slightly discolored | Do. |
| 3 | Discolored | Do. |
| 4 | Considerably discolored | Limit of use. |
| 5 | Extremely discolored | Not usable. |

EXAMPLE 8

The same reactor as used in Example 1 was charged with the following reactants:

| | Parts |
|---|---|
| Mineral spirit | 600 |
| Urethanated safflower oil | 800 |
| Methyl methacrylate | 400 |
| Styrene | 150 |
| Acrylonitrile | 50 |
| Direct Fast Yellow GN | 12 |
| Benzoyl peroxide | 3 | and they were reacted at 80° C. for 10 hours under agitation. Thus there was obtained a pigment dispersion of the solids content of 50% exhibiting a yellow color. A colored film obtained from this dispersion was hard, flexible and lustrous. Thus, the dispersion was usable as a paint as it was.

EXAMPLE 9

The same reactor as used in Example 1 was charged with the following reactants:

| | Parts |
|---|---|
| Mineral spirit | 500 |
| 50% soy bean oil-modified alkyd resin | 800 |
| Methyl methacrylate | 280 |
| Styrene | 60 |
| Acrylonitrile | 40 |
| Acrylic acid | 60 |
| Rhodamine B Base | 10 |
| Benzoyl peroxide | 2 |

They were reacted at 80° C. for 10 hours under agitation. Thus there was obtained a pigment dispersion exhibiting a magenta color. The film prepared from this dispersion was hard, flexible and glossy.

EXAMPLE 10

A reactor was charged with 600 parts of mineral spirit and 800 parts of an epoxy-modified alkyd resin, and the mixture was maintained at 80° C. under agitation. Separately, a beaker was charged with 6.0 parts of Rhodamine B, 6.0 parts of Rhodamine 6GCP and 40.0 parts of 30% aqueous solution of sodium dodecyl benzene sulfonate, and the mixture was heated to form a hydrophobic dyestuff complex. Then, a mixture of 200 parts of methyl methacrylate, 120 parts of styrene, 240 parts of acrylonitrile and 40 parts of 2-hydroxyethyl methacrylate was added to the content of the beaker. Thus, the dyestuff complex was selectively dissolved in the monomer phase and the aqueous phase was separated in the bottom portion of the beaker, which was removed by a separating funnel. Then, 4.0 parts of α,α'-azobisisobutyronitrile was dissolved uniformly into the monomer phase containing the hydrophobic dyestuff complex. The solution was added dropwise to the content of the reactor maintained at 80° C. over a period of time of 4 hours. After completion of the dropwise addition, the reaction was further continued for 6 hours. Thus there was obtained a pigment dispersion exhibiting a pink color with a fluorescent brightness, which could be used as a fluorescent paint.

EXAMPLE 11

The same reactor as used in Example 1 was charged with the following reactants:

| | Parts |
|---|---|
| Mineral spirit | 100 |
| Dioctyl fumarate | 30 |
| α,α'-Azobisisobutyronitrile | 0.3 |

The dropping funnel of the reactor was charged with the following reactants and they were uniformly blended:

| | Parts |
|---|---|
| Mineral spirit | 200 |
| Acrylonitrile | 60 |
| Ethyl acrylate | 50 |
| Methyl methacrylate | 100 |
| Allyl alcohol | 15 |
| Styrene | 45 |
| Aizene Catilon Brilliant Yellow 5GLH | 9 |
| 50% aqueous solution of sodium polyoxyethylene alkyl sulfate | 18 |
| α,α'-Azobisisobutyronitrile | 3.0 |

The content of the reactor was maintained at 80° C. and reacted for 1 hour under agitation. Then, the content of the dropping funnel was added dropwise to the content of the reactor over a period of time of 3 hours. Then, the reaction was carried out for 7 hours. Thus there was obtained a pigment dispersion having a particle size of about 1μ and exhibting a yellow color. The product had a good light fastness.

EXAMPLE 12

The same reactor as used in Example 1 was charged with the following reactants:

| | Parts |
|---|---|
| Mineral spirit | 450 |
| Linseed oil | 150 |
| Petroleum resin | 100 |
| Methyl acrylate | 100 |
| Acrylonitrile | 150 |
| Methacrylic acid | 50 |
| Aizene Catilon Orange RH | 3.0 |
| α,α'-Azobisisobutyronitrile | 1.5 | and they were reacted at 80° C. for 9 hours under agitation. Thus, there was obtained a pigment dispersion exhibiting an orange color.

EXAMPLE 13

When Example 12 was repeated by employing safflower oil instead of the linseed oil in Example 12, there was obtained a similar pigment dispersion exhibiting an orange color.

EXAMPLE 14

This example was conducted almost in the same manner as in Example 7.

A reactor was charged with the following reactants:

| | Parts |
|---|---|
| High boiling point petroleum hydrocarbon solvent (boiling point=250–270° C.) | 300 |
| Safflower oil-modified alkyd resin | 90 |
| Ester gum (melting point=180° C.) | 60 |
| Polyethylene wax | 50 | and they were homogeneously dissolved at 120°–150° C. under agitation. Then temperature of the mixture was maintained at 80° C.

Separately, a beaker was charged with the following reactants:

| | Parts |
|---|---|
| Rhodamine B | 20 |
| 30% aqueous solution of sodium dodecyl benzene sulfonate | 66 | and they were heated to form a hydrophobic dyestuff complex. Then, 310 parts of methyl acrylate was added to the contents of the beaker. Thus the hydrophobic dyestuff complex was selectively dissolved in methyl acrylate and the aqueous phase was separated in the lower part of the beaker, which was removed by a separating funnel. Then, a mixture of the following recipe:

| | Parts |
|---|---|
| Acrylonitrile | 150 |
| Acrylic acid | 30 |
| α,α'-Azobisisobutyronitrile | 4 | was added to the contents of the funnel, and blended uniformly. Then, the mixture was added dropwise to the contents of the reactor maintained at 80° C. over a period of time of 5 hours. After completion of the dropwise addition, the reaction was carried out for 2 hours. Then, 5 parts of ethylene glycol dimethacrylate was added dropwise over a period of time of 30 minutes, and the reaction was further carried out for 6 hours. Thus, there was obtained a very viscous pigment dispersion exhibiting a magenta color with a fluorescent brightness. The resulting pigment dispersion was prepared into an ink in the same manner as the sample ink A was prepared in Example 7, and the printing was conducted in the same manner as in Example 7. The light fastness and coloring property were similar to those of the sample ink A, and the ink prepared from the pigment dispersion of this example was improved over the sample ink A with respect to resistance to the vinyl coating.

REFERENTIAL EXAMPLE 1

A metal reactor was charged with 800 parts of p-toluene sulfonamide and 200 parts of paraformaldehyde (80% active), and the mixture was agitated in an oil bath until the temperature inside the reactor reached 160° C. to effect the polycondensation reaction. Then, the temperature was returned to room temperature to obtain a

REFERENTIAL EXAMPLE 2

In the same reactor as used in Referential Example 1, 20 parts of borax was uniformly dissolved 80 parts of water at 80° C., and 90 parts of paraformaldehyde (80% active) and 260 parts of dimethyl hydantoin were added to the solution. Then the mixture was heated to 140° C., under agitation, and 500 parts of p-toluene sulfonamide and 125 parts of paraformaldehyde (80% active) were added to the mixture. The reaction was conducted by elevating the temperature to 160° C. and the temperature was returned to room temperature to obtain a brittle resin.

REFERENTIAL EXAMPLE 3

The resin obtained in Referential Example 2 was maintained at 130° C. and a mixture of 70 parts of spiroguanamine and 20 parts of 80% active paraformaldehyde was added to the resin under agitation. Then the temperature was elevated to 150° C. and the reaction was carried out until the flowability was reduced. Then, the temperature was returned to room temperature to obtain a resinous product.

REFERENTIAL EXAMPLE 4

A metal reactor was charged with the following reactants:

| | Parts |
|---|---|
| Water | 80 |
| Borax | 20 |
| Isocyanuric acid | 130 |
| 80% active paraformaldehyde | 90 | and they were reacted under agitation in an oil bath maintained at 170° C. Thus, the reaction mixture became transparent. When the inside temperature reached 110° C., 150 parts of p-toluene sulfonamide and 40 parts of 80% active paraformaldehyde were added to the reaction mixture. When the inside temperature was elevated to 130° C., 40 parts of benzoguanamine and 12 parts of 80% active paraformaldehyde were added to the reaction mixture, following which the reaction was further continued until the inside temperature became 150° C. and then the temperature was returned to room temperature. Thus there was obtained a brittle resin.

REFERENTIAL EXAMPLE 5

Referential Example 1 was repeated with further incorporation of 900 parts of Rhodamine B into the reactants. Thus, there was obtained a resin product having the weight ratio of resin/dyestuff=50/50.

REFERENTIAL EXAMPLE 6

Referential Example 2 was repeated with further incorporation of 750 parts of Rhodamine B base into the reactants to obtain a dyestuff containing resin product.

REFERENTIAL EXAMPLE 7

Referential Example 3 was repeated with further incorporation of 300 parts of Blankophor WT into the reactants to obtain a dyestuff-containing resin product.

EXAMPLE 15

The same reactor as used in Example 1 was charged with 450 parts of mineral spirit and 200 parts of 70 soy bean oil-modified alkyd resin, and the mixture was maintained at 80° C. under agitation.

Separately, in a beaker 15 parts of the p-toluene sulfonamide-formaldehyde resin obtained in Referential Example 1 was dissolved uniformly in 150 parts of acrylonitrile, and the solution was incorporated with the following reactants:

| | Parts |
|---|---|
| Aizene Catilon Orange RH | 7 |
| Sodium alkyl sulfosuccinate | 14.0 |
| Methyl acrylate | 170.0 |
| $\alpha,\alpha'$-Azobisisobutyronitrile | 3.0 | and they were dispersed and dissolved uniformly. The resulting solution was added dropwise to the content of the reactor maintained at 80° C. over a period of time of 3 hours, and the reaction was carried out for 7 hours to obtain a pigment dispersion exhibiting an orange color.

EXAMPLE 16

When Example 15 was repeated by employing the dimethyl hydantoin-p-toluene sulfonamide-formaldehyde resin obtained in Referential Example 2 instead of the resin of Referential Example 1 used in Example 15, there was obtained a similar pigment dispersion exhibiting an orange color.

EXAMPLE 17

When Example 15 was repeated by employing the dimethyl hydantoin-p-toluene sulfonamide-spiroguanamine-formaldehyde resin obtained in Referential Example 3 instead of the resin of Referential Example 1 used in Example 15, there was obtained a similar pigment dispersion exhibiting an orange color.

EXAMPLE 18

When Example 15 was repeated by employing the isocyanuric acid-p-toluene sulfonamide-benzoguanamine-formaldehyde resin obtained in Referential Example 4 instead of the resin of Referential Example 1 used in Example 15, there was obtained a similar pigment dispersion exhibiting an orange color.

EXAMPLE 19

In the same reactor as used in Example 1, 450 parts of mineral spirit and 200 parts of 70% soy bean oil-modified alkyd resin were maintained at 80° C. under agitation. Separately, in a beaker 20 parts of the colored resin obtained in Referential Example 5 was dissolved in 150 parts of acrylonitrile, and then 150 parts of methyl acrylate, 50 parts of methacrylic acid and 4 parts of $\alpha,\alpha'$-azobisisobutyronitrile were dispersed and dissolved uniformly into the solution. The resulting solution was added dropwise to the contents of the reactor maintained at 80° C. over a period of time of 3 hours, and the reaction was carried out for 7 hours. Thus there was obtained a pigment dispersion exhibiting a magenta color with a fluorescent brightness.

EXAMPLE 20

Example 19 was repeated by employing 20 parts of the colored resin obtained in Referential Example 6 instead of 20 parts of the colored resin used in Example 19. Thus there was obtained a similar pigment dispersion exhibiting a magenta color with a fluorescent brightness.

EXAMPLE 21

Example 19 was repeated by employing 20 parts of the white colored resin obtained in Referential Example 7 instead of 20 parts of the colored resin used in Example 19. Thus there was obtained a pigment dispersion exhibiting a fluorescent brightening activity.

EXAMPLE 22

Example 7 was repeated by conducting the copolymerization in the presence of 10 parts of 2,2',4,4'-tetrahydroxy benzophenone. Thus there was obtained a pigment dispersion exhibiting a magenta color with a fluorescent brightness. When the dispersion was prepared into a printing ink in the same manner as the sample ink A was prepared in Example 7 and the printing was conducted in the same manner as in Example 7, it was found that the ink prepared form the dispersion of this example was improved over the sample ink A with respect to the light fastness.

EXAMPLE 23

The same reactor as used in Example 1 was charged with the following reactants:

| | Parts |
|---|---|
| Cyclohexane | 450 |
| Vinyl propionate | 50 |
| Dioctyl itaconate | 350 |
| Benzoyl peroxide | 0 | and they reacted at 80° C. for 3 hours under agitation. Then, a preliminarily prepared dispersion of the following recipe:

| | Parts |
|---|---|
| Methacrylonitrile | 150 |
| Allyl nicotinate | 50 |
| Kayaku Silk Scarlet | 5 |
| Distearyl dimethyl ammonium chloride | 5 |
| 2,6-di-tert.-butyl-4-methyl phenol | 5 |
| Benzoyl peroxide | 1 | was added dropwise to the contents of the reactor over a period of 3 hours. After completion of the dropwise addition, the reaction was carried out for 6 hours. Thus there was obtained a pigment dispersion exhibiting a clear red color.

EXAMPLE 24

The same reactor as used in Example 1 was charged with 160 parts of linseed oil. The temperature was elevated to 130° C. and the agitation was effected for 3 hours while blowing air in the reactor. Then the temperature was lowered at 80° C. and this temperature was maintained. A homogeneous mixture of the following recipe:

| | Parts |
|---|---|
| Mineral spirit | 45 |
| Methyl methacrylate | 60 |
| Styrene | 10 |
| Acrylonitrile | 20 |
| 2-hydroxy-3-chloropropylmethacrylate | 5 |
| Rhodamine B Base | 2 |
| Benzoyl peroxide | 0.5 | was added dropwise to the linseed oil in the reactor through the dropping funnel of the reactor over a period of time of 2 hours. Then the temperature was elevated to 90° C. and the reaction was carried out for 8 hours. Thus there was obtained a pigment dispersion exhibiting a magenta color with a fluorescent brightness.

EXAMPLE 25

The same reactor as used in Example 1 was charged with the following reactants:

| | Parts |
|---|---|
| Petroleum type high boiling point solvent (boiling point=270–290° C.) | 400 |
| 70% soy bean oil-modified alkyd resin | 130 |
| Petroleum resin (melting point =130° C.) | 70 | and they were dissolved uniformly at 120° C. under agitation. Then the temperature of the contents of the reactor was maintained at 80° C. In the same manner as in Example 7, a dyestuff complex was prepared from the following reactants:

| | Parts |
|---|---|
| Rhodamine B | 16 |
| 30% aqueous solution of sodium dodecyl benzene sulfonate | 53 | and the resulting dyestuff complex was dissolved in 250 parts of methyl methacrylate, while the aqueous phase was separated and removed by a separating funnel. The dyestuff complex solution was then incorporated with 120 parts of acrylonitrile, 30 parts of acrylic acid and 5 parts of α,α'-azobisisobutyronitrile and they were blended uniformly. The resulting homogeneous mixture was added dropwise to the contents of the reactor maintained at 80° C. over a period of time of 4 hours, and then the reaction was carried out for 6 hours. Thus there was obtained a pigment dispersion exhibiting a magenta color.

EXAMPLE 26

The same reactor as used in Example 1 was charged with the following reactants:

| | Parts |
|---|---|
| Petroleum type high boiling point solvent (boiling point=270–290° C.) | 400 |
| 70% soy bean oil-modified alkyd resin | 130 |
| Petroleum resin (melting point=130° C.) | 70 | and they were dissolved uniformly at 120° C. under agitation, following which the temperature was maintained at 80° C. A homogeneous solution of the following recipe:

| | Parts |
|---|---|
| Methyl methacrylate | 250 |
| Acrylonitrile | 120 |
| Acrylic acid | 30 |
| α,α'-Azobisisobutyronitrile | 5 | was added dropwise to the contents of the reactor through the dropping funnel of the reactor over a period of time of 4 hours, and the reaction was carried out for 6 hours to obtain a milky-white polymer dispersion. A dyestuff complex prepared in advance by heating the following reactants:

| | Parts |
|---|---|
| Rhodamine B | 16 |
| 20% aqueous solution of sodium dodecyl benzene sulfonate | 80 | was added to the above polymer dispersion, and the mixture was agitated at 85° C. The dyeing of the polymer dispersion was thus conducted for 10 hours while effecting the sampling every hour. Thus, there was obtained a pigment dispersion exhibiting a concentrated magenta color with a fluorescent brightness. The water contained in the dispersion product was removed by distillation under reduced pressure. The product exhibited very good coloring property and light resistance. The color concentration of the sample obtained when the dyeing was conducted for 1 hour reached approximately the saturation value and was almost the same as the color concentration of the product sampled after 10 hours' dyeing. The color concentration of the product obtained after the dyeing had been conducted at 85° C. for 10 hours was almost the same as the color concentration of the pigment dispersion obtained in Example 25.

COMPARATIVE EXAMPLE 6

A milky-white polymer dispersion was prepared in the same manner as in Example 26, and 16 parts of Rhodamine B was added thereto. The mixture was agitated at 85° C. for 10 hours.

The color concentration of the resulting pigment dispersion was much inferior to that of the product obtained in Example 26, and in the product of this Comparative Example, it was found that phases of the dye-stuff alone were present here and there.

EXAMPLE 27

A milky-white polymer dispersion was prepared in the same manner as in Example 26, and 16 parts of Rhodamine B and 50 parts of water were added thereto. Then, the mixture was agitated at 85° C. for 10 hours. The water contained in the resulting dispersion was removed by distillation under reduced pressure. The resulting pigment dispersion was a little inferior to the products of Examples 25 and 26 with respect to the color concentration and light fastness, but it was utilized to practical use without any disadvantage.

EXAMPLE 28

The same reactor as used in Example 1 was charged with the following reactants:

| | Parts |
|---|---|
| Petroleum type high boiling point solvent (boiling point=270–290° C.) | 400 |
| 70% soy bean oil-modified alkyd resin | 130 |
| Petroleum resin (melting point=130° C.) | 70 | and they were dissolved uniformly at 120° under agitation. Then, the temperature was maintained at 80° C. A homogeneous mixture of the following recipe:

| | Parts |
|---|---|
| Diethyl maleate | 50 |
| Styrene | 50 |
| Methyl acrylate | 150 |
| Acrylonitrile | 120 |
| N-vinyl imidazole | 30 |
| α,α'-Azobisisobutyronitrile | 5 | was added dropwise to the contents of the reactor through the dropping funnel of the reactor over a period of time of 4 hours. Then, the reaction was carried out at 85° C. for 6 hours to obtain a milky-white polymer dispersion. Then, the polymer dispersion was incorporated with 16 parts of Elio Fast Red 2GS, 16 parts of sodium lauryl amine acetate and 40 parts of water, and the mixture was agitated for 5 hours. The water contained in the mixture was removed by distillation under reduced pressure. Thus, there was obtained a pigment dispersion exhibiting a concentrated red color.

EXAMPLE 29

The same reactor as used in Example 1 was charged with the following reactants:

| | Parts |
|---|---|
| Liquid synthetic polybutadiene | 300 |
| Mineral spirit | 400 |
| n-Propyl acrylate | 60 |
| α,α'-Azobisisobutyronitrile | 0.6 | and they were reacted at 80° C. for 3 hours under agitation.

Separately, a beaker was charged with 40 parts of Aizene Catilon Brilliant Yellow 5GLH and 200 parts of 20% aqueous solution of sodium polyoxyethylene alkyl phenyl sulfate, and the mixture was heated to form a dyestuff complex. When 140 parts of acrylonitrile was added to the reaction mixture, the dyestuff complex was dissolved selectively into the acrylonitrile and the aqueous phase was separated in the lower portion of the beaker. The organic phase was separated from the aqueous phase by means of a separating funnel, and 1.5 parts of α,α'-azobisisobutyronitrile was added uniformly to the organic phase. Then, the mixture was added dropwise to the content of the reactor maintained at 80° C. over a period of time of 3 hours, and the reaction was carried out for 6 hours after completion of the dropwise addition. Thus, there was obtained a pigment dispersion exhibiting a concentrated yellow color. The dyestuff was incorporated in the dispersion product in an amount of 20% based on the monomers. Thus, it will be readily understood that the use of the dyestuff complex can attain a high dyestuff concentration in the product pigment dispersion.

What we claim is:

1. A dispersion of finely divided pigment particles in an organic liquid selected from the group consisting of aliphatic, aromatic and alicyclic hydrocarbons having little or no polarity, said particles comprising
   (i) a solid solution consisting of a copolymer formed by polymerization of copolymerizable unsaturated monomers selected from the group consisting of unsaturated monomers having a low affinity for dyestuffs, unsaturated monomers having one or two cyano groups and unsaturated monomers having a functional group exhibiting high affinity for dyestuffs and a dyestuff dissolved uniformly in said copolymer, said dyestuff being incapable of copolymerizing with said monomers, and
   (ii) a protective layer of a stabiilzer covering the solid solution, said stabiilzer being compatible with or chemically bonded to the copolymer and containing a long chain hydrocarbon group capable of solvation with said organic liquid, whereby allowing said solid solution to be dispersed stably in said organic liquid, and
   the average size of said particles being in the range of from 0.1 to 5μ.

2. The dispersion of finely divided pigment particles in accordance with claim 1, wherein said copolymerizable unsaturated monomers include 99-20% by weight of at least one monomer having a low affinity for dyestuffs and 1-80% by weight of at least one monomer having a high affinity for dyestuffs.

3. The dispersion of finely divided pigment particles in accordance with claim 1, wherein said copolymerizable unsaturated monomers include 80-5% by weight of at least one copolymerizable unsaturated monomer having one or two cyano groups and 20-95% by weight of at least one other copolymerizable unsaturated monomer.

4. The dispersion of finely divided pigment particles in accordance with claim 1, wherein said copolymerizable unsaturated monomers comprise at least one monomer A having a low affinity for dyestuffs, at least one monomer B having one or two cyano groups and at least one monomer C having an acidic or basic group, and the proportion of the monomers is 90-20% by weight of the monomer A, 80-5% by weight of the monomer B and 1-30% by weight of the monomer C.

5. The dispersion of finely divided pigment particles in accordance with claim 1, wherein said copolymerizable unsaturated monomers comprise at least one monomer A having a low affinity for dyestuffs and at least one monomer C having an acidic or basic group, and the proportion of the monomers is 99-70% by weight of the monomer A and 1-30% by weight of the monomer C.

6. The dispersion of finely divided pigment particles in accordance with claim 1, wherein the dyestuff is selected from the group consisting of basic dyestuffs, cationic dyestuffs, acidic dyestuffs, direct dyestuffs and solvent dyestuffs, each being incapable of polymerizing with said copolymerizable unsaturated monomer.

7. The dispersion of finely divided pigment particles in accordance with claim 1, wherein the dyestuff is present in the form of a complex of a member selected from basic dyestuffs, cationic dyestuffs, direct dyestuffs and acidic dyestuffs, with a surfactant having an electric charge opposite to that of the dyestuff, so as to improve the solubility of the dyestuff.

8. The dispersion of finely divided pigment particles in accordance with claim 1, wherein the dyestuff is a member selected from the group consisting of coloring fluorescent dyestuffs of basic, cationic, acidic and solvent dyestuff and fluorescent brightening dyestuffs of the basic, cationic, acidic and solvent dyestuff.

9. The dispersion of finely divided pigment particles in accordance with claim 1, wherein said copolymerizable unsaturated monomers comprise at least one monomer B having one or two cyano groups and including a polycondensation polymer soluble in said monomer B but insoluble in the organic liquid, in an amount of 1-15% by weight based on the monomer B, whereby the dispersibility or solubility of the dyestuff is improved.

10. The dispersion of finely divided pigment particles in accordance with claim 1, which comprises at least one member selected from the group consisting of antioxidants, ultraviolet absorbents and ultraviolet-resistant stabilizers.

11. The dispersion of finely divided pigment particles in accordance with claim 1, wherein stabilizer is selected from the group consisting of unsaturated fatty acid modified alkyd resins more than 50% in oil length, alkyl esters of acrylic acid, methacrylic acid, maleic acid, fumaric acid and itaconic acid having an alkyl group of at least 6 carbon atoms, and polymers of said esters.

12. A process for the preparation of a stabilized dispersion of finely divided pigment particles, comprising polymerizing at least two copolymerizable unsaturated monomers selected from the group consisting of unsaturated monomers having a low affinity for dyestuffs, unsaturated monomers having one or two cyano groups and unsaturated monomers having a functional group exhibiting high affinity for dyestuffs in an organic liquid selected from the group consisting of aliphatic aromatic and alicyclic hydrocarbons having little or no polarity capable of dissolving said copolymerizable unsaturated monomers but incapable of dissolving a copolymer formed from said monomers, in the presence of a dyestuff and a stabilizer solvated with said organic liquid, and the weight ratio of the stabiilzer/monomers being in the range of from 70/30 to 10/90.

13. A process for the preparation of a dispersion of finely divided pigment particles, comprising polymerizing copolymerizable unsaturated monomers including 99-20% by weight of at least one monomer having a low affinity for dyestuffs and 1-80% by weight of at least one monomer having a high affinity for dyestuffs, in an organic liquid selected from the group consisting of aliphatic, aromatic and alicyclic hydrocarbons having little or no polarity capable of dissolving said copolymerizable unsaturated monomers but incapable of dissolving a copolymer formed by copolymerization of said monomers, in the presence of a stabiilzer solvated with said organic liquid, the weight ratio of the stabilizer/monomers being in the range of from 70/30 to 10/90, whereby a stable dispersion of finely divided copolymer particles is obtained, and then adding a dyestuff or dyestuff complex to the dispersion so as to color the copolymer particles uniformly.

14. A paint or printing ink composition comprising a dispersion of finely divided pigment particles as claimed in claim 1.

References Cited

UNITED STATES PATENTS

| | | | |
|---|---|---|---|
| 3,640,931 | 2/1972 | Clarke et al. | 260—23 EM |
| 3,532,662 | 10/1970 | Ansdell | 260—34.2 |
| 2,938,873 | 5/1960 | Kazenas | 252—301.2 R |
| 3,412,034 | 11/1968 | McIntosh et al. | 252—301.2 R |
| 3,419,515 | 12/1968 | Schmidle et al. | 260—33.6 UA |

FOREIGN PATENTS

| | | | |
|---|---|---|---|
| 958,023 | 5/1964 | Great Britain | 260—33.6 UA |
| 822,709 | 10/1959 | Great Britain | 260—33.6 UA |
| 1,095,288 | 12/1967 | Great Britain | 260—33.6 UA |
| 1,143,404 | 2/1969 | Great Britain | 260—33.6 UA |

DONALD E. CZAJA, Primary Examiner

R. W. GRIFFIN, Assistant Examiner

U.S. Cl. X.R.

106—22, 30; 117—161 UC, 161 UZ, 161 K; 252—301.2 R; 260—23 P, 28.5 R, 29.6 RB, 29.6 T, 29.6 AN, 33.6 UA, 33.6 R, 34.2, 40 R, 416, 876, 881, 885, DIG. 38